United States Patent [19]

De Filippis

[11] Patent Number: 5,233,250

[45] Date of Patent: Aug. 3, 1993

[54] THREE-PHASE BRUSHLESS MOTORS WITH HALF-WAVE CONTROL

[75] Inventor: Pietro De Filippis, Milan, Italy

[73] Assignee: Industrie Magneti Marelli SpA, Milan, Italy

[21] Appl. No.: 841,804

[22] Filed: Feb. 26, 1992

[30] Foreign Application Priority Data

Mar. 4, 1991 [IT] Italy .............................. TO91A00149

[51] Int. Cl.$^5$ ............................................. H02K 21/12
[52] U.S. Cl. .................................. 310/156; 310/67 R; 310/179; 310/254
[58] Field of Search ................... 310/156, 67 R, 68 R, 310/177, 254, 261, 179, 180, 185

[56] References Cited

U.S. PATENT DOCUMENTS

| | | |
|---|---|---|
| 4,311,933 | 1/1982 | Riggs et al. . |
| 4,358,693 | 11/1982 | Palmer .......................... 310/156 UX |
| 4,549,121 | 10/1985 | Gale . |
| 4,845,411 | 7/1989 | Smith . |
| 4,874,975 | 10/1989 | Hertrich .............................. 310/156 |
| 4,882,511 | 11/1989 | von der Heide .................. 310/67 R |
| 4,987,329 | 1/1991 | Schmidt ............................. 310/156 |
| 5,047,680 | 9/1991 | Torok ................................. 310/156 |
| 5,059,875 | 10/1991 | De Salme . |

FOREIGN PATENT DOCUMENTS

| | | |
|---|---|---|
| 0341630 | 11/1989 | European Pat. Off. . |
| 1563418 | 5/1970 | Fed. Rep. of Germany . |
| 3527296 | 9/1986 | Fed. Rep. of Germany . |
| 1157274 | 7/1969 | United Kingdom . |

Primary Examiner—R. Skudy
Attorney, Agent, or Firm—Sughrue, Mion, Zinn, Macpeak & Seas

[57] ABSTRACT

The motor includes a rotor with an angular array of 2n permanent magnets with a predetermined pole pitch, in which alternate magnets have opposite polarities but the same angular extent substantially equal to ⅔ of the pole pitch.

2 Claims, 4 Drawing Sheets

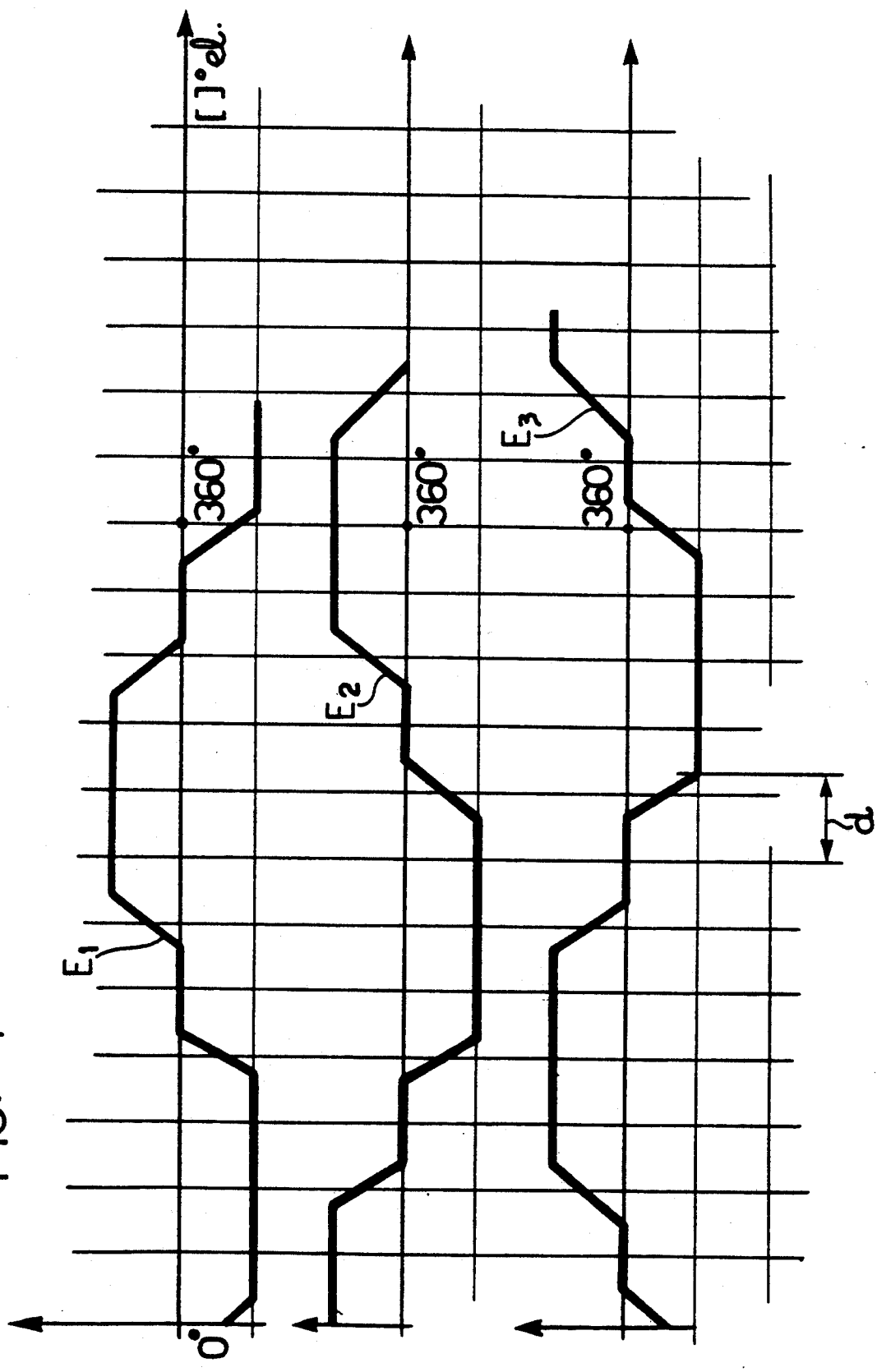

THREE-PHASE BRUSHLESS MOTORS WITH HALF-WAVE CONTROL

BACKGROUND OF THE INVENTION

The present invention relates to three-phase brushless motors with half-wave control circuits.

More specifically, the subject of the invention is a three-phase brushless motor including, in known manner, a rotor with an angular array of 2n (n = 1, 2, 3 ... ) permanent magnets with a predetermined pole pitch $\tau$ = 360°/2n), in which alternate magnets have opposite polarities but the same angular extent.

In brushless motors of this type which have been produced up to now, the angular extent of each magnet is substantially equal to the pole pitch and each magnet is therefore substantially next to, that is, close to the adjacent magnet or magnets.

FIG. 1 of the appended drawings shows a typical layout of a half-wave control circuit for a three-phase brushless motor. The circuit includes, in known manner, three controlled-conduction devices T1, T2 and T3 (for example, MOSFET transistors) between the two poles of a direct-current voltage supply, each being arranged in series with a respective winding or phase P1, P2 and P3 of the motor. An electronic control circuit CC makes each device T1, T2 and T3 conductive cyclically and in sequence for a period of time corresponding to a conduction angle of 120 electrical degrees, as shown by the first three waveforms indicated W1, W2 and W3 in FIG. 2 of the appended drawings. Each power switch thus conducts for ⅓ of the electrical operating cycle (whilst the others are not conductive).

Since, in three-phase brushless motors of the prior art, the angular extent of each magnet of the rotor is substantially equal to the pole pitch, the electromotive forces induced in the individual phases correspond substantially to the waveforms indicated F1, F2 and F3 in FIG. 2. As can be seen, although one phase is made conductive at a time, an electromotive force is generated in each phase throughout almost 180 electrical degrees. Only a portion corresponding to about 120 electrical degrees of the electromotive force generated in each phase, however, is used. An excess electromotive force is thus generated in each individual phase for about 60 electrical degrees. This clearly represents wastage involving the inefficient usage of the materials constituting the motor, particularly the permanent magnets and the frame, usually of iron, in which the magnetic flux generated by the magnets is enclosed.

SUMMARY OF THE INVENTION

The object of the present invention is to provide a three-phase brushless motor for use with a half-wave control circuit, in which the geometry of the magnets of the rotor is optimised in order to overcome the problems of the corresponding prior-art brushless motors described above.

BRIEF DESCRIPTION OF THE DRAWINGS

According to the invention, this object is achieved by a three-phase brushless motor of the type specified above, whose main characteristic lies in the fact that the angular extent of each permanent magnet of the rotor is substantially equal to ⅔ of the pole pitch.

As will become clearer from a prior art following, this characteristic means that an electromotive force is generated in each phase only for a period corresponding to the electrical angle in which the electromotive force is actually used.

The new geometry of the magnets of the rotor according to the invention thus saves expensive material (the permanent magnets) and enables the rotor as a whole to be considerably lighter with the consequent advantage that a motor whose other characteristics are substantially the same has less inertia.

According to another characteristic, the angular extent of each permanent magnet of the rotor is preferably between a minimum value substantially equal to ⅔ of the pole pitch and a maximum value of ⅔ of the pole pitch plus ½ of the angular extent of the opening of each peripheral recess in the stator in which a winding or phase of the motor is housed.

By virtue of this characteristic, there is a considerable reduction in the so-called reluctance torque (or, in English terminology, the "cogging" torque) which, as is known, results from the unevenness of the magnetic flux between the rotor and the stator which causes fluctuations in the rate of rotation and the generation of noise.

Figure 1:
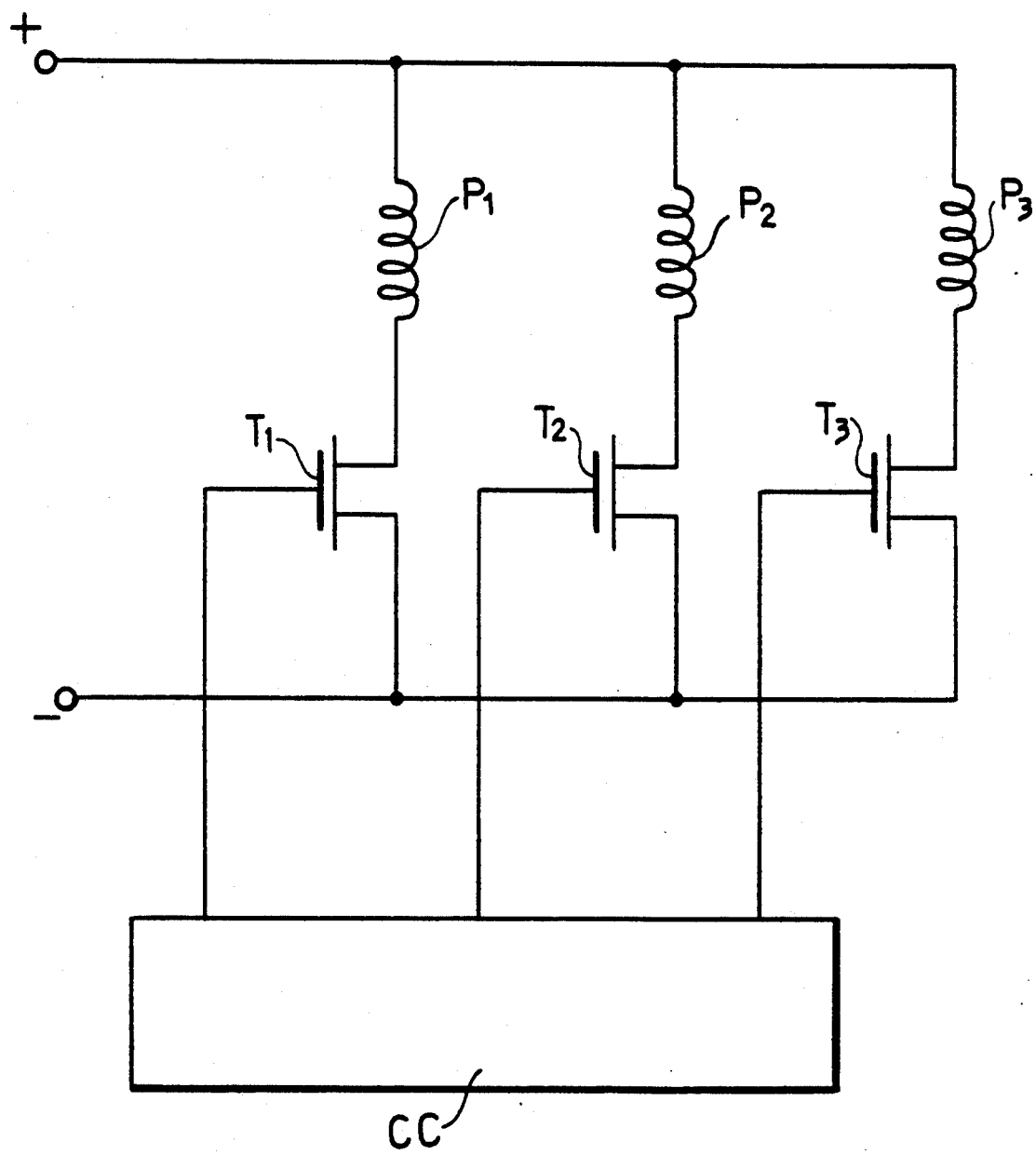
Figure 2:
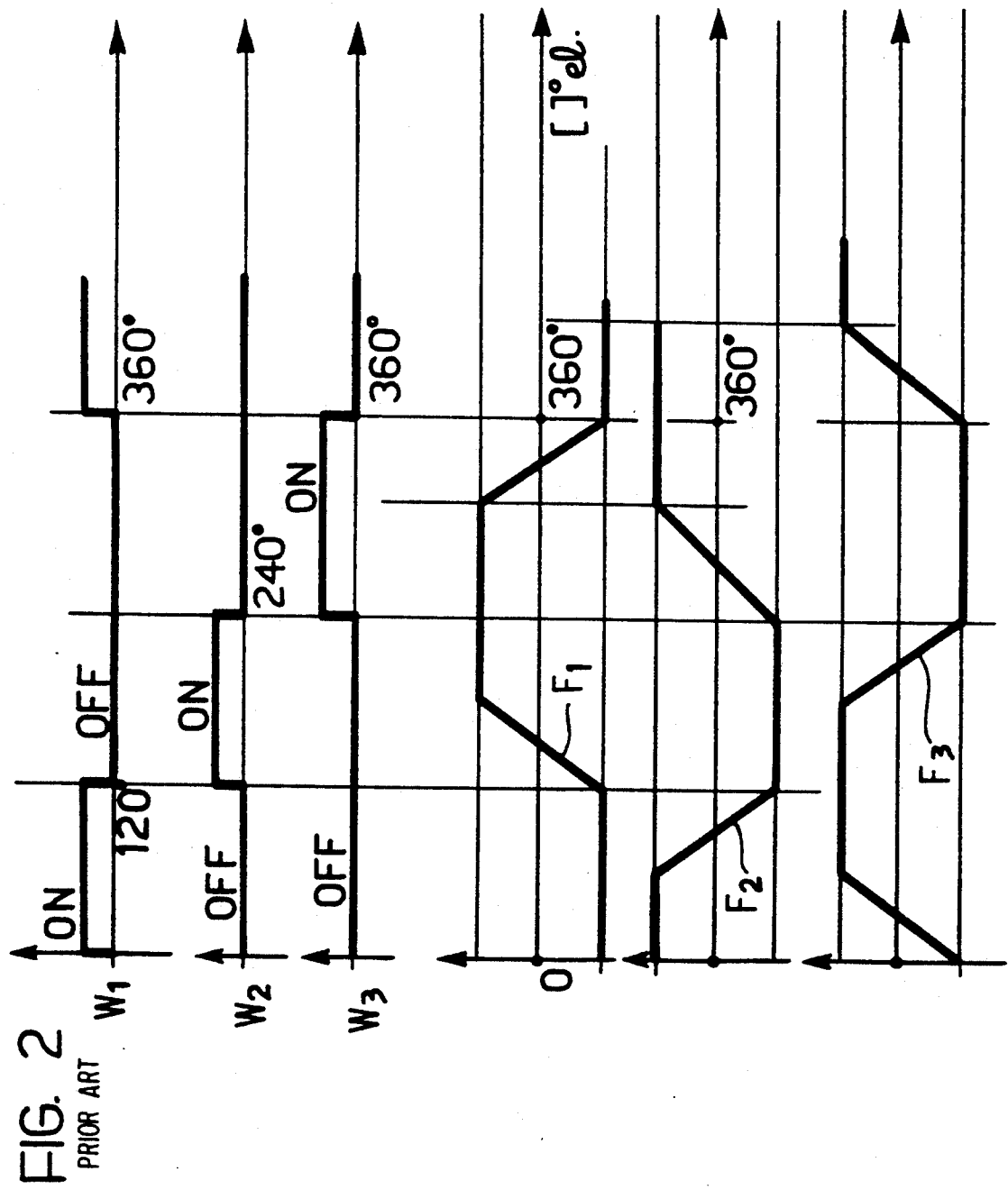
Figure 3:
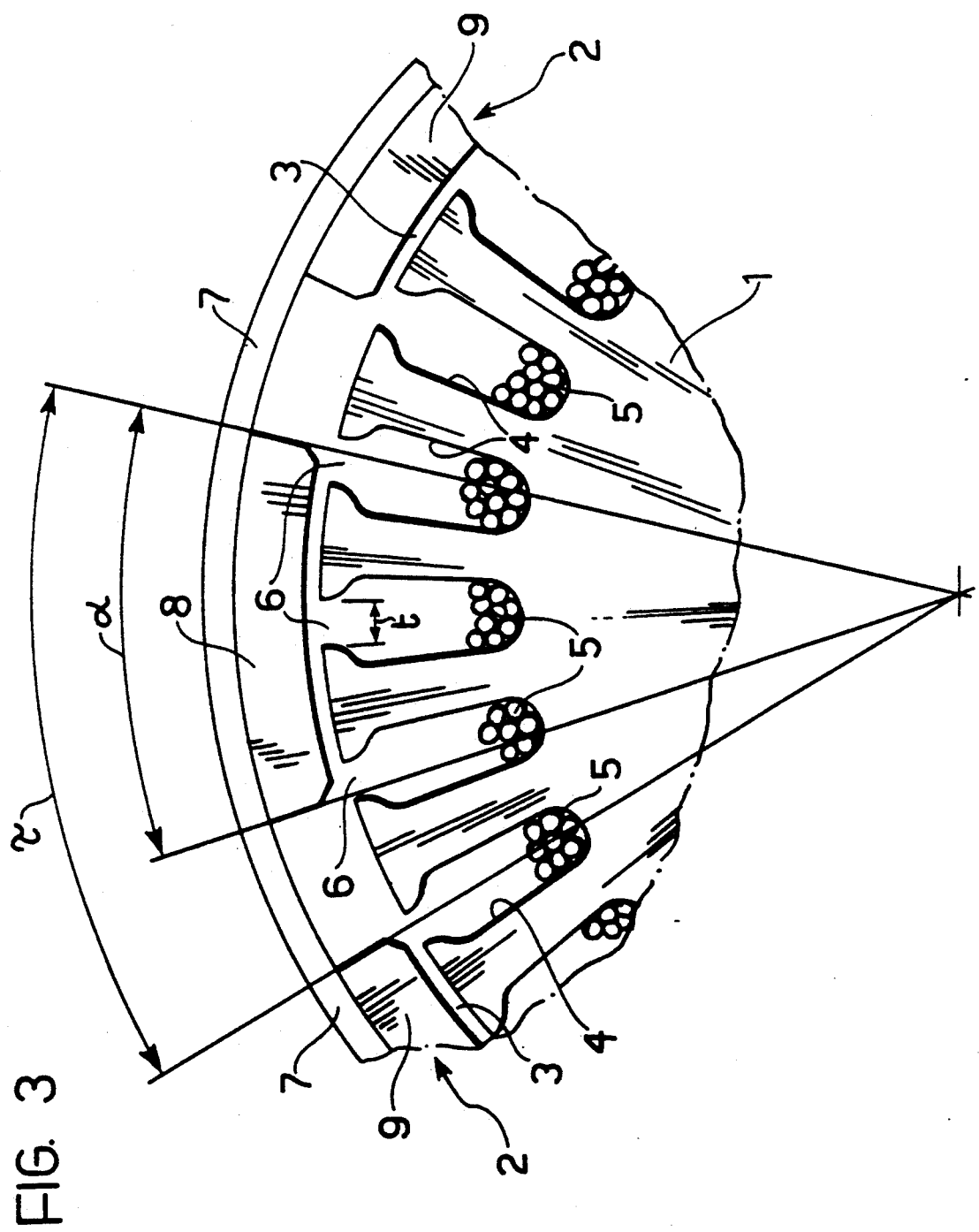

Further characteristics and advantages of the invention will become clear from the detailed description which follows with reference to the appended drawings, provided purely by way of non-limiting example, in which:

FIG. 1, which has already been described, shows the electrical layout of a half-wave control circuit for a three-phase brushless motor, FIG. 2 shows the prior art waveforms according to which the transistors of the circuit of FIG. 1 are driven and the waveforms of the electromotive forces correspondingly generated in a three-phase electric motor according to the prior art, FIG. 3 is a partial cross-section of a three-phase brushless motor with eight poles formed according to the invention, and FIG. 4 is a series of graphs showing qualitatively the waveforms of the electromotive forces induced in the windings or phases of a three-phase brushless motor according to the invention.

DETAILED DESCRIPTION OF THE INVENTION

The three-phase brushless motor with eight poles shown partially in FIG. 3 includes a stator 1 and a rotor 2 separated by an air-gap, indicated 3. In the embodiment shown by way of example, the stator is inside the rotor. The motor could, however, be produced in dual form, that is, with the rotor inside the stator.

In known manner, the stator 1 includes a pack of substantially cylindrical plates the periphery of which has recesses or channels 4 in which the windings or phases 5 of the motor are housed.

The recesses 4 have narrow openings 6 facing the rotor. The openings are identical and their angular extents on the periphery of the stator are indicated t.

The rotor 2 includes a substantially cylindrical iron frame 7 to the internal surface of which pole extensions 8 and 9 constituted by permanent magnets with alternating polarities are fixed.

In FIG. 3, the pole pitch, that is, the angle between homologous ends of two adjacent permanent magnets, is indicated $\tau$. In general, if the rotor 2 has 2n permanent magnets, the pole pitch $\tau$ is 360°/2n.

The permanent magnets 8 and 9 have equal angular extents, indicated $\alpha$ in FIG. 3.

According to the invention, the extent a of the magnets 8 and 9 is selected so as to be substantially ⅔ of the pole pitch τ. The magnets 8 and 9 are thus evenly spaced and each is separated from the adjacent magnets by a space whose extent is about ⅓ of the pole pitch.

By virtue of the geometric characteristics of the permanent magnets of the rotor and their distribution, the electromotive forces induced in the individual phases in operation behave according to the waveforms F1, F2 and F3 shown qualitatively in FIG. 4. As can be seen, in this case the fraction of the electrical cycle during which the useful portion of each electromotive force is present is reduced to ⅔ of that of a similar half-wave, three-phase brushless motor of the prior art. In particular, as can be seen in FIG. 4, the electromotive force induced in one phase practically falls away when an electromotive force starts to appear in another phase, and so on. In a three-phase brushless motor according to the invention, the electromotive forces are thus induced in the phases for the fraction of the electrical cycle which is strictly necessary and sufficient and there is thus no wastage.

Since the angular extents of the magnets 8 and 9 are smaller than in prior-art brushless motors, there is a beneficial reduction in the magnetic material used. The reduced sizes of the magnets 8 and 9 lead to a corresponding reduction in the magnetic flux linkage in the iron frame 7. Thus, the thickness of the frame can also conveniently be reduced with further advantages in terms of weight and reduced inertia.

An examination of the waveforms of the electromotive forces E1, E2 and E3 of FIG. 4 using the circuit of FIG. 1 shows that there is a certain delay (indicated d for P3 in FIG. 4) in the appearance of each electromotive force after it has crossed zero. This characteristic of the waveforms of the electromotive forces induced results in a further advantage of the motor according to the invention which will now be explained.

When the controlled-conduction device T1 associated with the phase P1 is made conductive in operation, a potential difference substantially equal to the difference between the supply voltage and the instantaneous valve of the electromotive force generated in the phase P1 acts on the phase P1. A current whose intensity depends on that potential difference therefore flows in the phase P1; after T1 controlled-conduction device has switched, this current increases with a time constant which depends on the resistance and the inductance of phase P1. In particular, the inductance of phase P1 slows the increase of the current. This effect is particularly noticeable and problematical at high speeds since the electromotive force induced in the phase tends to approximate to the value of the supply voltage.

Now, if in a brushless motor according to the invention T1 is switched at about the time when the electromotive force E1 induced in the associated phase P1 crosses zero, the delay with which the electromotive force induced appears in the phase advantageously accelerates the increase of the current in the phase. This means that more power is available particularly at fast rates of rotation.

With reference again to the angular extent a of the permanent magnets 8 and 9, conveniently, this extent is between a minimum value substantially equal to ⅔ of the pole pitch τ and a maximum value of ⅔ of the pole pitch τ plus ¼ of the angular extent t of the openings of the recesses 4 in the stator.

If the angular extent alpha selected for the permanent magnets is between these minimum and maximum values, there is an advantageous reduction in the reluctance torque (the cogging torque). The fluctuation of the speed and the noise generated are thus reduced.

In order to minimise the reluctance torque, the pack of plates of the stator 1 may also conveniently be of a size such that the material constituting the plates operates in conditions of maximum magnetic permeability ($\mu$). With the usual ferrous materials, this condition is satisfied if the pack is of a size such that the magnetic flux B induced therein is less than or equal to 1 tesla.

Naturally, the principle of the invention remaining the same, the forms of embodiment and details of construction may be varied widely with respect to those described and illustrated purely by way of non-limiting example, without thereby departing from the scope of the present invention.

What is claimed is:

1. A three-phase brushless motor with a half-wave control circuit comprising a rotor having an angular array of permanent magnets each having an identical angular extent with a predetermined pole pitch wherein alternate magnets have opposite polarities and a stator separated from said rotor by an air gap and having a plurality of recesses with windings of the motor housed therein and the recesses having openings facing the air gap with each opening having a narrow angular extent, wherein the angular extent of each permanent magnet of the rotor is between a minimum value substantially equal to ⅔ of the pole pitch and a maximum value of ⅔ of the pole pitch plus ¼ of the angular extent of the opening of each recess of the stator.

2. A three-phase brushless motor according to claim 1, wherein the stator includes a pack of plates of ferrous magnetic material of a size such that magnetic flux induced therein is not greater than 1 tesla in operation.

* * * * *